US011125094B2

United States Patent
Miller et al.

(10) Patent No.: US 11,125,094 B2
(45) Date of Patent: Sep. 21, 2021

(54) EXTENDED PILOT RING SEAL ARRANGEMENT FOR INSTALLATION DAMAGE PREVENTION

(71) Applicant: United Technologies Corporation, Farmington, CT (US)

(72) Inventors: Jonathan Logan Miller, Ware, MA (US); Michael M. Davis, North Granby, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 106 days.

(21) Appl. No.: 16/372,775

(22) Filed: Apr. 2, 2019

(65) Prior Publication Data

US 2020/0318490 A1    Oct. 8, 2020

(51) Int. Cl.
  *F01D 11/00*    (2006.01)

(52) U.S. Cl.
  CPC ........ *F01D 11/003* (2013.01); *F05D 2240/55* (2013.01)

(58) Field of Classification Search
  CPC ...... F01D 11/00; F01D 11/001; F01D 11/005; F01D 11/003; F01D 25/16; F01D 25/18; F01D 25/183; F16J 15/16; F16J 15/3484; F16J 15/441; F05D 2240/55; F05D 2240/60; F05D 2220/32
  See application file for complete search history.

(56) References Cited

U.S. PATENT DOCUMENTS

| 3,129,922 | A |   | 4/1964  | Rosenthal |
| 4,211,424 | A | * | 7/1980  | Stein ........................ F16J 15/54 277/352 |
| 4,296,934 | A |   | 10/1981 | Atkin |
| 5,014,999 | A |   | 5/1991  | Makhobey |

(Continued)

FOREIGN PATENT DOCUMENTS

| EP | 112269 A2  | 6/1984 |
| EP | 3354945 A1 | 8/2018 |

(Continued)

OTHER PUBLICATIONS

Extended European Search Report dated Aug. 28, 2020, received for corresponding European Application No. 20166968.6, 7 pages.

*Primary Examiner* — Christopher Verdier
*Assistant Examiner* — Elton K Wong
(74) *Attorney, Agent, or Firm* — Kinney & Lange, P.A.

(57) ABSTRACT

A seal assembly includes a first and second seats. The first seat includes an axial portion extending circumferentially around a center axis and extending axially from a first end to a second end. A radial portion extends circumferentially around the axial portion and extends radially from the axial portion between the first end and the second end. A cavity is formed in the radial portion and extends circumferentially around the axial portion. A second seat includes a radial segment extending circumferentially around the center axis and extending radially from an inner surface to an outer surface of the radial segment. An axial segment extends circumferentially around the first end of the first seat, and extends axially from the radially segment to a distal end. The axial segment includes a tapered outer surface that tapers radially inward toward the distal end. The distal end is received in the cavity.

19 Claims, 5 Drawing Sheets

(56) References Cited

U.S. PATENT DOCUMENTS

| | | | |
|---|---|---|---|
| 8,939,710 B2 | 1/2015 | Webb | |
| 9,677,411 B2 | 6/2017 | Nakazawa et al. | |
| 10,145,255 B2 | 12/2018 | Miller et al. | |
| 2005/0206088 A1* | 9/2005 | Anderson | F16J 15/008 |
| | | | 277/500 |
| 2008/0260521 A1 | 10/2008 | Werro et al. | |
| 2012/0043725 A1* | 2/2012 | Jahn | F16J 15/3472 |
| | | | 277/306 |
| 2013/0188895 A1* | 7/2013 | Devitt | F16J 15/342 |
| | | | 384/121 |
| 2013/0330171 A1* | 12/2013 | Miller | F16J 15/441 |
| | | | 415/111 |
| 2015/0377051 A1* | 12/2015 | Davis | F16J 15/104 |
| | | | 277/647 |
| 2016/0040544 A1 | 2/2016 | Desjardins | |
| 2016/0312634 A1* | 10/2016 | Davis | F16J 15/064 |
| 2017/0016350 A1* | 1/2017 | Miller | F01D 25/183 |
| 2017/0362949 A1* | 12/2017 | Von Berg | F16J 15/30 |

FOREIGN PATENT DOCUMENTS

| | | |
|---|---|---|
| EP | 3415723 A1 | 12/2018 |
| EP | 3543566 A1 | 9/2019 |

\* cited by examiner

EXTENDED PILOT RING SEAL ARRANGEMENT FOR INSTALLATION DAMAGE PREVENTION

BACKGROUND

The present disclosure relates to gas turbine engines, and more specifically to seals for use in turbine sections of gas turbine engines.

Carbon seal assemblies are used in gas turbine engines between rotating shafts and static frames, and between two rotating shafts. Carbon seal assemblies maintain lubricating fluids within a bearing compartment or bearing chamber and seal against hot air intrusion or cooling air leakage. Some carbon seal assemblies include multiple carbon rings stacked axially against one another between a first seal seat and a second seal seat. During the assembling process, the carbon rings can be chipped and damaged as the carbon rings are mounted between the seal seats. This damage to the carbon rings can cause reduced performance of the carbon seal assembly and premature maintenance.

SUMMARY

In one aspect of the disclosure, a seal assembly includes a first seat and a second seat. The first seat includes an annular portion extending circumferentially around a center axis and extending axially from a first end to a second end. A radial portion extends circumferentially around the annular portion and extends radially from the annular portion. The radial portion is positioned axially on the annular portion between the first end and the second end. A cavity extends axially into the radial portion at a base of the radial portion and extends circumferentially around the center axis. The second seat includes a radial segment extending circumferentially around the center axis and extending radially from an inner surface to an outer surface of the radial segment. An axial segment extends circumferentially around the first end of the first seat, and extends axially from the radially segment to a distal end. At least a portion of an outer surface of the axial segment tapers radially inward toward the distal end. The distal end is received in the cavity of the first seat.

The seal assembly of the preceding paragraph can optionally include, additionally and/or alternatively, any one or more of the following features, configurations and/or additional components:

a first seal ring extending circumferentially around the axial segment of the second seat and positioned axially between the radial portion of the first seat and the radial segment of the second seat; and a second seal ring extending circumferentially around the axial segment of the second seat and positioned axially between the first seal ring and the radial portion of the first seat;

the first seal ring and the second seal ring each comprise carbon;

a spring between the first seal ring and the second seal ring, wherein the spring is configured to bias the first seal ring against the radial segment of the second seat and bias the second seal ring against the radial portion of the first seat;

the first end of the annular portion of the first seat contacts the radial segment of the second seat;

the distal end of the second seat is received in the cavity of the first seat, and the distal end does not contact the radial portion of the first seat;

the first seat further comprises: a shelf formed on the radial portion radially outward of the cavity and on an opposite side of the radial portion from the cavity; and/or the distal end of the axial segment is tapered.

In another aspect of the disclosure, a seal assembly includes a first seat and a second seat. The first seat includes an axial portion extending circumferentially around a center axis and extending axially from a first end to a second end. A radial portion extends circumferentially around the axial portion and extends radially from the axial portion between the first end and the second end. A cavity is formed in the radial portion and extends circumferentially around the axial portion. A second seat includes a radial segment that extends circumferentially around the center axis and that extends radially from an inner surface to an outer surface of the radial segment. An axial segment extends circumferentially around the first end of the first seat, and extends axially from the radially segment to a distal end. The axial segment includes a tapered outer surface that tapers radially inward toward the distal end. The distal end is received in the cavity of the first seat.

The seal assembly of the preceding paragraph can optionally include, additionally and/or alternatively, any one or more of the following features, configurations and/or additional components:

a first seal ring extending circumferentially around the axial segment of the second seat and positioned axially between the radial portion of the first seat and the radial segment of the second seat; and a second seal ring extending circumferentially around the axial segment of the second seat and positioned axially between the first seal ring and the radial portion of the first seat;

the first seal ring and the second seal ring each comprise carbon;

the second seal ring extends circumferentially around a portion of the tapered outer surface of the axial segment;

a spring between the first seal ring and the second seal ring, wherein the spring is configured to bias the first seal ring against the radial segment of the second seat and bias the second seal ring against the radial portion of the first seat;

the first end of the axial portion of the first seat contacts the radial segment of the second seat;

the distal end of the second seat is received in the cavity of the first seat, and the distal end does not contact the radial portion of the first seat;

the first seat further comprises: a shelf formed on the radial portion radially outward of the cavity and on an opposite side of the radial portion from the cavity, and wherein the shelf extends circumferentially around the center axis on the radial portion;

the distal end of the axial segment is tapered;

the distal end of the axial segment is not tapered; and/or the second seat further comprises: a ridge extending radially inward of the axial segment and contacting the axial portion of the first seat, and wherein the ridge extends circumferentially around the center axis.

In another aspect of the disclosure, a seat for a seal assembly includes a radial segment extending circumferentially around a center axis and extending radially from an inner surface to an outer surface of the radial segment. An axial segment of the seat extends circumferentially around the center axis and extends axially from the radially segment to a distal end. At least a portion of an outer surface of the axial segment tapers radially inward toward the distal end.

Persons of ordinary skill in the art will recognize that other aspects and embodiments are possible in view of the entirety of the present disclosure, including the accompanying figures.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings. Like reference numerals identify similar structural elements.

DETAILED DESCRIPTION

The disclosure relates to a seal assembly for use in a gas turbine engine between two rotating shafts or between a rotating shaft and a static structure. The seal assembly includes two carbon rings stacked together along a center axis between a front seat and a rear seat. The front seat includes an axial segment with a tapered outer surface and the rear seat includes a radial portion with a cavity sized to receive a distal end of the axial segment of the front seat. The tapered outer surface of the axial segment on the front seat provides a smooth ramp that reduces wear on the two carbon rings as they are assembled onto the front seat. The cavity also reduces wear on the two carbon rings by covering and restraining the distal end of the axial segment and reducing the likelihood of the front seat misaligning radially with the rear seat. The seal assembly is discussed in greater detail below with reference to the figures.

Figure 1:
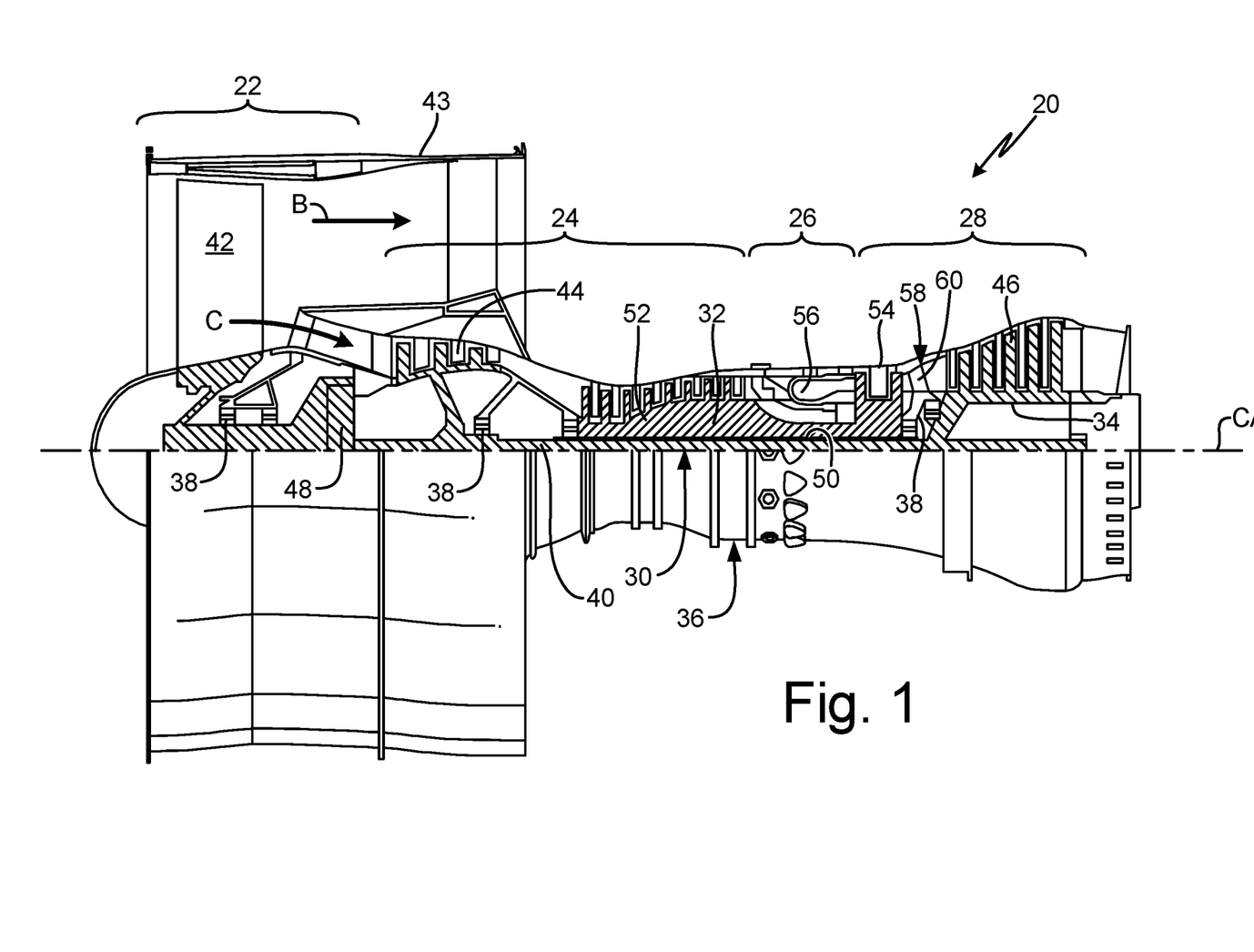
FIG. 1 is a partial cross-sectional view of a gas turbine engine.

FIG. 1 is a quarter-sectional view that schematically illustrates example gas turbine engine 20 that includes fan section 22, compressor section 24, combustor section 26 and turbine section 28. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes low speed spool 30 and high speed spool 32 mounted for rotation about center axis CA of gas turbine engine 20 relative to engine static structure 36 via several bearing assemblies 38. It should be understood that various bearing assemblies 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing assemblies 38 about center axis CA.

Figure 2:
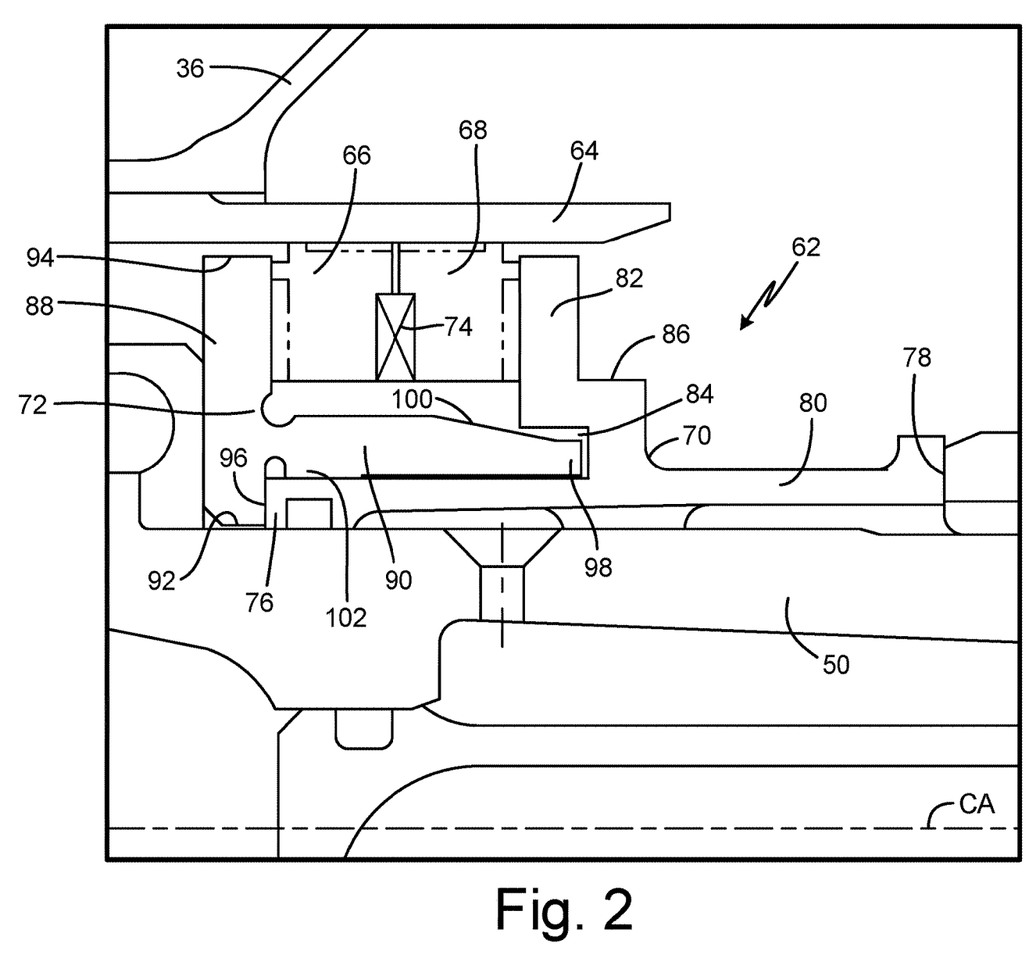
FIG. 2 is a cross-sectional view of a static structure, a seal assembly, and a shaft of the gas turbine engine from FIG. 1.
Figure 3:
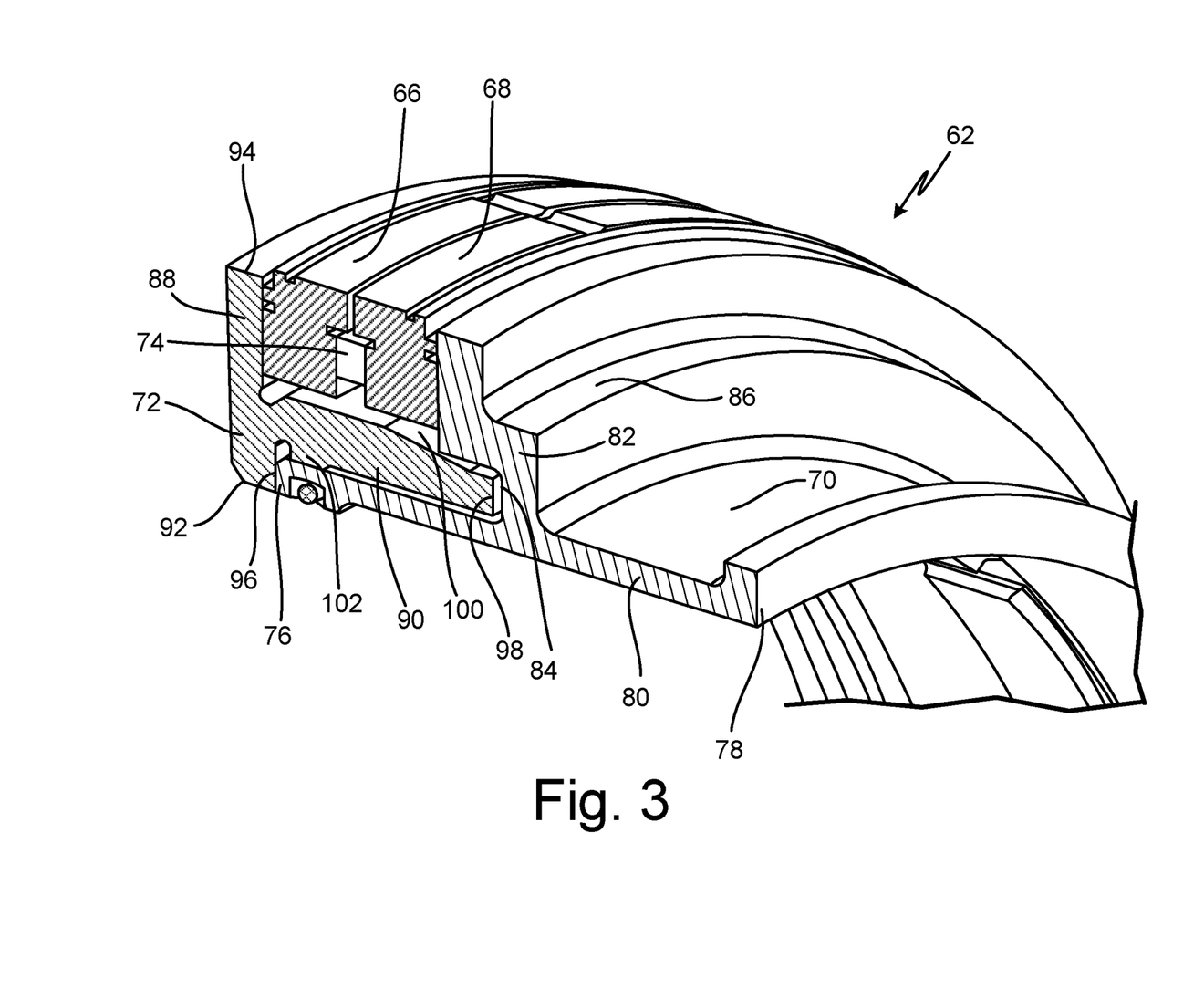
FIG. 3 is a perspective cross-sectional view of the seal assembly from FIG. 2.

Combustor 56 is arranged between high pressure compressor 52 and high pressure turbine 54. Mid-turbine frame 58 of engine static structure 36 can be arranged generally between high pressure turbine 54 and low pressure turbine 46. Mid-turbine frame 58 further supports bearing assemblies 38 in turbine section 28 as well as setting airflow entering the low pressure turbine 46. Mid-turbine frame 58 includes vanes 60, which are in the core airflow path and function as an inlet guide vane for low pressure turbine 46. The core airflow C is compressed first by low pressure compressor 44 and then by high pressure compressor 52 mixed with fuel and ignited in combustor 56 to produce high speed exhaust gases that are then expanded through high pressure turbine 54, mid-turbine frame 58, and low pressure turbine 46. As shown in FIGS. 2 and 3, gas turbine engine 20 includes seal assembly 62 to reduce or eliminate air and fluid leakage between static structure 36 and outer shaft 50.

FIGS. 2 and 3 will be discussed concurrently. FIG. 2 is a cross-sectional view of static structure 36, outer shaft 50, and seal assembly 62 of gas turbine engine 20 shown in FIG. 1. FIG. 3 is a perspective cross-sectional view of seal assembly 62. As shown in FIG. 2, seal assembly 62 includes seal static liner 64, first carbon ring 66, second carbon ring 68, rear seat 70, front seat 72, and springs 74 (only one of which is shown in FIGS. 2 and 3). Rear seat 70 includes first end 76, second end 78, axial portion 80, radial portion 82, cavity 84, and shelf 86. Front seat 72 includes radial segment 88 and axial segment 90. Radial segment 88 includes inner surface 92, outer surface 94, and stop surface 96. Axial segment 90 includes distal end 98, tapered outer surface 100, and ridge 102

Seal assembly 62 is disposed radially between static structure 36 and outer shaft 50 relative to center axis CA. Seal static liner 64 is connected to static structure 36 such that seal static liner 64 does not rotate about center axis CA. Seal static liner 64 extends circumferentially around first carbon ring 66 and second carbon ring 68. First carbon ring 66, second carbon ring 68, rear seat 70, and front seat 72 are positioned radially between seal static liner 64 and outer shaft 50.

Rear seat 70 is annular and connected to outer shaft 50 such that rear seat 70 rotates with outer shaft 50 during operation of gas turbine engine 20. Axial portion 80 of rear seat 70 is annular and extends axially from first end 76 to second end 78, and extends circumferentially around center axis CA and outer shaft 50. First end 76 is axially forward of second end 78. Radial portion 82 of rear seat 70 extends radially from axial portion 80 and extends circumferentially around axial portion 80. Radial portion 82 is positioned axially on axial portion 80 between first end 76 and second end 78. Cavity 84 is formed in radial portion 82 of rear seat 70 and extends axially aft into radial portion 82 at a base of radial portion 82. Cavity 84 is annular and extends circumferentially around center axis CA and axial portion 80. Cavity 84 is sized radially and axially to receive distal end 98 of front seat 72. Shelf 86 is formed on radial portion 82 and is radially outward of cavity 84 and is on an opposite side (the aft side) of radial portion 82 from cavity 84. Shelf 86 extends circumferentially around center axis CA on radial portion 82 and reduces the overall mass of radial portion 82.

Front seat 72 is also annular and connected to outer shaft 50 such that front seat 72 rotates with outer shaft 50 during operation of gas turbine engine 20. Front seat 72 is positioned axially forward of rear seat 70. Radial segment 88 of front seat 72 is axially forward of first end 76 of rear seat 70 and extends circumferentially around center axis CA and outer shaft 50. Radial segment 88 extends radially from inner surface 92 to outer surface 94 of radial segment 88. Axial segment 90 is annular and extends circumferentially around center axis CA and first end 76 of rear seat 70. Axial segment 90 is connected to radial segment 88 and extends axially aft from radial segment 88 to distal end 98. Distal end 98 of front seat 72 extends into cavity 84 of rear seat 70. Stop surface 96 is formed on an aft side of radial segment 88 and is radially inward of axial segment 90 and extends radially from inner surface 92 to axial segment 90, and extends circumferentially around center axis CA. First end 76 of rear seat 70 contacts stop surface 96 and prevents distal end 98 from bottoming out in cavity 84 such that distal end 98 does not contact radial portion 82 of rear seat 70.

Tapered outer surface 100 forms at least a portion of an outer surface of axial segment 90 and tapers radially inward as tapered outer surface 100 extends aftward toward distal end 98. At least a portion of tapered surface 100 extends into cavity 84 and reduces the outer diameter of axial segment 90 so that distal end 98 of axial segment 90 can fit inside cavity 84. In the embodiment of FIGS. 2 and 3, tapered surface 100 terminates forward of distal end 98 such that distal end 98 is not tapered. Ridge 102 is formed on a radially inner surface of axial segment 90 and extends radially inward from a main body of axial segment 90 and contacts axial portion 80 of rear seat 70. Ridge 102 can extend circumferentially around axial portion 80 and spaces most of axial segment 90 from axial portion 80 and thereby reduces the amount of friction between front seat 72 and rear seat 70 during the assembling of seal assembly 62.

First seal ring 66 extends circumferentially around axial segment 90 of front seat 72 and is positioned axially between radial portion 82 of rear seat 70 and radial segment 88 of front seat 72. Second seal ring 68 also extends circumferentially around axial segment 90 of front seat 72 and is positioned axially between first seal ring 66 and radial portion 82 of rear seat 70. In the embodiment of FIGS. 2 and 3, second seal ring 68 extends circumferentially around a portion of tapered outer surface 100. Both first seal ring 66 and second seal ring 68 can be carbon sealing rings. First seal ring 66 and second seal ring 68 both contact seal static liner 64 to reduce or block leakage flow (not shown) across seal assembly 62. First seal ring 66 contacts radial segment 88 of front seat 72 to reduce or block leakage flow between first seal ring 66 and front seat 72. Second seal ring 66 contacts radial portion 82 of rear seat 70 to reduce or block leakage flow between second seal ring 66 and rear seat 70.

Springs 74 (only one of which is shown in FIGS. 2 and 3) are disposed between first seal ring 66 and second seal ring 68 to bias first seal ring 66 forward and against front seat 72, and to bias second seal ring 68 aftward against rear seat 70. Springs 74 extend axially between first seal ring 66 and second seal ring 68 and can be wave springs, coil springs, or any other kind of springs that are capable of fitting between first seal ring 66 and second seal ring 68 and surviving the thermal environment of seal assembly 62 while also exerting the necessary load between first seal ring 66 and second seal ring 68. Springs 74 can also include combinations of the above-described springs. For example, springs 74 can include wave springs and coil springs in the same assembly. Each of springs 74 can be disposed between a pair of flat washers (not shown). The flat washers reduce wear between springs 74 and first seal ring 66 and second seal ring 68. During operation of gas turbine engine 20, first seal ring 66 and second seal ring 68 are in contact with seal static liner 64 and are free to rotate relative seal static liner 64 so as to reduce stress and wear on first seal ring 66 and second seal ring 68. First seal ring 66 and second seal ring 68 are also free to rotate relative to front seat 72 and rear seat 70 to reduce stress on first seal ring 66 and second seal ring 68. A method of assembly seal assembly 62 is discussed below with reference to FIGS. 4A-4E.

Figure 4A:
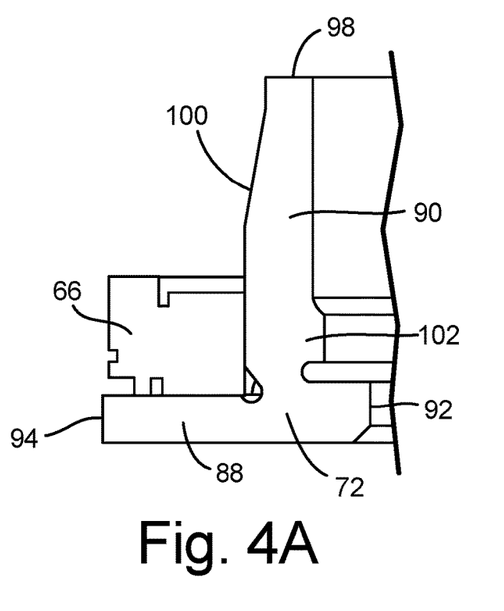
FIG. 4A is a cross-sectional view of a first seal ring assembled onto a first seal seat of the seal assembly from FIG. 3.
Figure 4B:
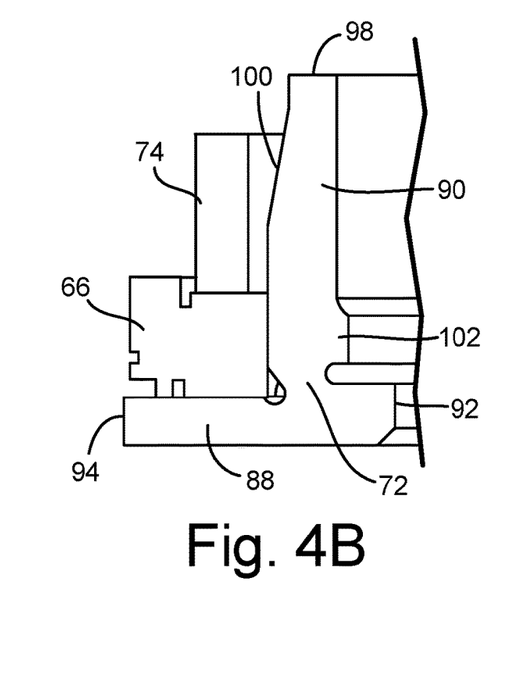
FIG. 4B is a cross-sectional view of the first seal ring and the first seal seat of FIG. 4A with the addition of a spring.
Figures 4C, 4D:
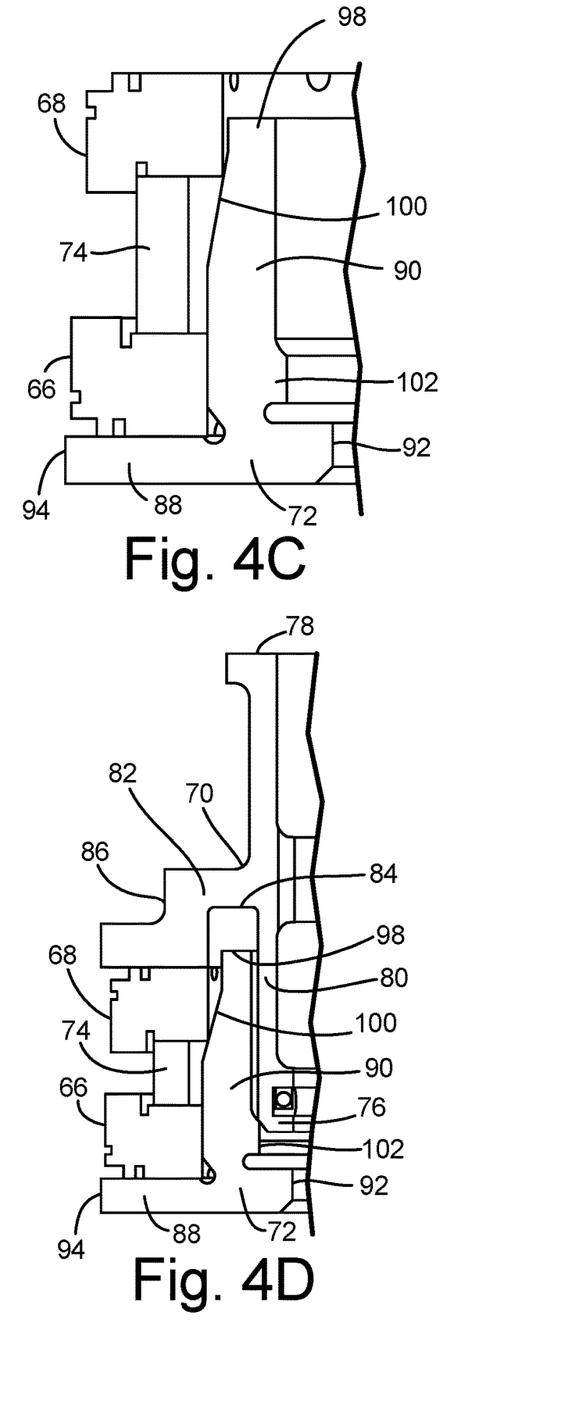
FIG. 4C is a cross-sectional view of the first seal ring, the first seal seat, and the spring of FIG. 4B with the addition of a second seal ring.
FIG. 4D is a cross-sectional view of the first seal ring, the first seal seat, the spring, and the second seal ring of FIG. 4C with the addition of a second seal seat.
Figure 4E:
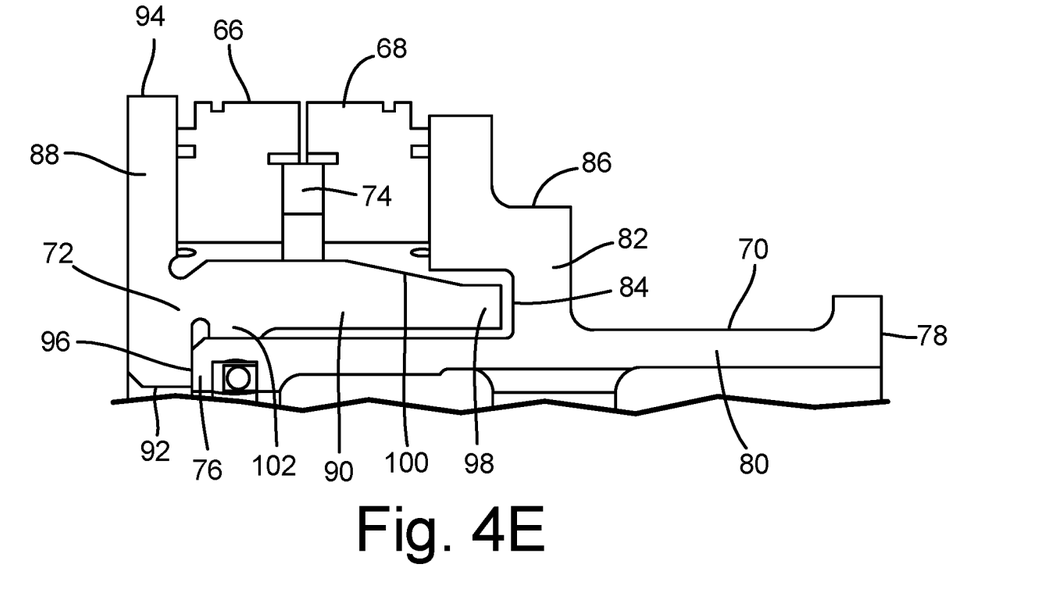
FIG. 4E is a cross-sectional view of the completed assembly of the first seal seat, the first seal ring, the spring, the second seal ring, and the second seal seat of FIG. 4D.

FIG. 4A is a cross-sectional view of first seal ring 66 assembled onto front seat 72. FIG. 4B is a cross-sectional view of first seal ring 66 and springs 74 (only one of which is shown) assembled onto front seat 72. FIG. 4C is a cross-sectional view of first seal ring 66, springs 74, and second seal ring 68 assembled onto front seat 72. FIG. 4D is a cross-sectional view of first seal ring 66, springs 74, second seal ring 68, and rear seat 78 assembled onto front seat 72. FIG. 4E is a cross-sectional view of the completed assembly of seal assembly 62.

Figure 5:
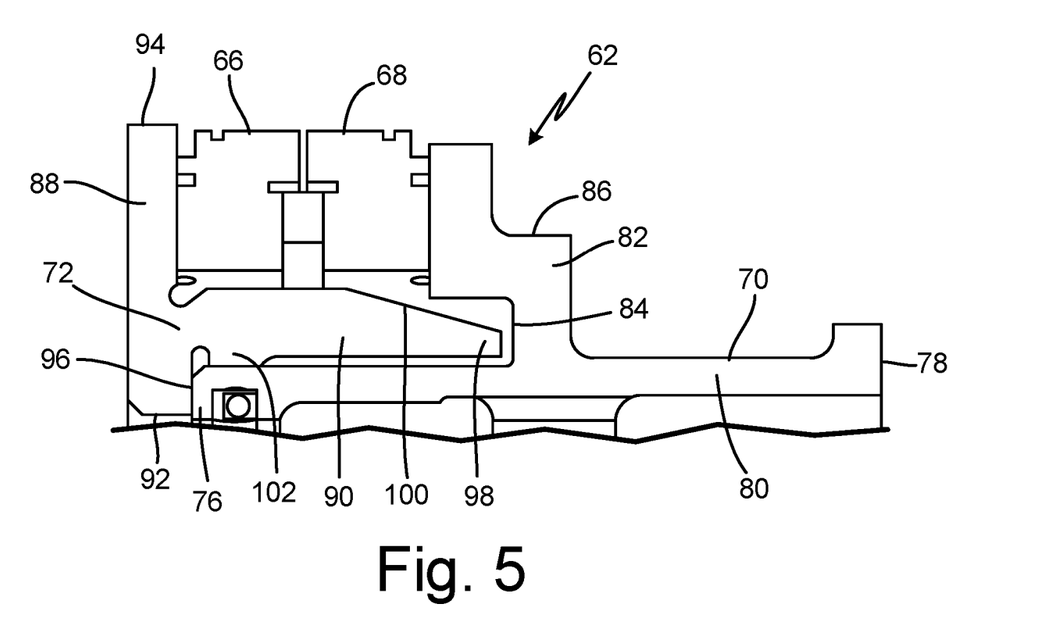
FIG. 5 is a cross-sectional view of another embodiment of the seal assembly.

As shown in FIGS. 4A-4E, seal assembly 62 is assembled first by sliding first seal ring 66 over and around axial segment 90. As first seal ring 66 is assembled onto axial segment 90, tapered outer surface 100 smoothly guides first seal ring 66 onto front seat 62 with little to no chipping or damage to first seal ring 66. Next, springs 74 are assembled onto first seal ring 66 and circumferentially around axial segment 90 of front seat 72. As shown in FIG. 4C, second seal ring 68 is then stacked on springs 74, which second seal ring 68 extending circumferentially around tapered outer surface 100. Rear seat 70 is then stacked on top of second seal ring 68 with distal end 98 of front seat 72 extending into cavity 84, as shown in FIG. 4D. Next, rear seat 70 and front seat 72 are brought together such that first end 76 of rear seat 70 abuts against stop surface 96 of front seat 72, as shown in FIGS. 4D and 4E. As rear seat 70 and front seat 72 are brought together, springs 74 are compressed between first seal ring 66 and second seal ring 68, and second seal ring 68 axially moves on axial segment 90 toward first seal ring 66. As second seal ring 68 moves on axial segment 90, tapered outer surface 100 provides a smooth ramp that guides second seal ring 68 into alignment with first seal ring 68 with minimal to no chipping or damage to second seal ring 68. FIG. 5 shows an alternative embodiment of tapered outer surface 100.

FIG. 5 is a cross-sectional view of another embodiment of the seal assembly 62. In the embodiment of FIG. 5, front seat 72 includes an axial segment 90 similar to the embodiment of FIGS. 2-4E except that tapered surface 100 extends to distal end 98 such that distal end 98 is tapered.

In view of the foregoing description, it will be recognized that the present disclosure provides numerous advantages and benefits. For example, the present disclosure provides seal assembly 62 with first seal ring 66 and second seal ring 68 stacked together between front seat 72 and rear seat 70. Front seat 72 includes axial segment 90 with tapered outer surface 100 and rear seat 70 includes radial portion 82 with cavity 84 sized to receive distal end 98 of axial segment 90 of front seat 72. Tapered outer surface 100 of axial segment 90 provides a smooth ramp that guides first seal ring 66 and second seal ring 68 into radially alignment without any significant chipping or damage to first seal ring 66 and second seal ring 68.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, while front seat 72 has been described in FIGS. 1-5 as being axially forward of rear seat 70, the order of front seat 72 and rear seat 70 can be reversed such that rear seat 70 is axially forward of front seat 72. Therefore, it is intended that the invention not be limited to the particular embodiment(s) disclosed, but that the invention will include all embodiments falling within the scope of the appended claims.

The invention claimed is:

1. A seal assembly comprises:
   a first seat comprising:
      an annular portion extending circumferentially around a center axis and extending axially from a first end to a second end;
      a radial portion extending circumferentially around the annular portion and extending radially from the annular portion, wherein the radial portion is positioned axially on the annular portion between the first end and the second end; and
      a cavity extending axially into the radial portion at a base of the radial portion and extending circumferentially around the center axis; and
   a second seat comprising:
      a radial segment extending circumferentially around the center axis and extending radially from an inner surface to an outer surface of the radial segment; and
      an axial segment extending circumferentially around the first end of the first seat, and extending axially from the radial segment to a distal end, wherein at least a portion of an outer surface of the axial segment tapers radially inward toward the distal end, and wherein the distal end is received in the cavity of the first seat.

2. The assembly of claim 1, further comprising:
   a first seal ring extending circumferentially around the axial segment of the second seat and positioned axially between the radial portion of the first seat and the radial segment of the second seat; and
   a second seal ring extending circumferentially around the axial segment of the second seat and positioned axially between the first seal ring and the radial portion of the first seat.

3. The assembly of claim 2, wherein the first seal ring and the second seal ring each comprise carbon.

4. The assembly of claim 2, further comprising:
   a spring between the first seal ring and the second seal ring, wherein the spring is configured to bias the first seal ring against the radial segment of the second seat and bias the second seal ring against the radial portion of the first seat.

5. The assembly of claim 1, wherein the first end of the annular portion of the first seat contacts the radial segment of the second seat.

6. The assembly of claim 1, wherein the distal end does not contact the radial portion of the first seat.

7. The assembly of claim 1, wherein the first seat further comprises:
   a shelf formed on the radial portion radially outward of the cavity and on an opposite side of the radial portion from the cavity.

8. The assembly of claim 1, wherein the distal end of the axial segment is tapered.

9. A seal assembly comprises:
   a first seat comprising:
      an axial portion extending circumferentially around a center axis and extending axially from a first end to a second end;
      a radial portion extending circumferentially around the axial portion and extending radially from the axial portion between the first end and the second end; and
      a cavity formed in the radial portion and extending circumferentially around the axial portion; and
   a second seat comprising:
      a radial segment extending circumferentially around the center axis and extending radially from an inner surface to an outer surface of the radial segment; and
      an axial segment extending circumferentially around the first end of the first seat, and extending axially from the radial segment to a distal end, wherein the axial segment comprises a tapered outer surface that tapers radially inward toward the distal end, and wherein the distal end is received in the cavity of the first seat.

10. The assembly of claim 9, further comprising:
    a first seal ring extending circumferentially around the axial segment of the second seat and positioned axially between the radial portion of the first seat and the radial segment of the second seat; and
    a second seal ring extending circumferentially around the axial segment of the second seat and positioned axially between the first seal ring and the radial portion of the first seat.

11. The assembly of claim 10, wherein the first seal ring and the second seal ring each comprise carbon.

12. The assembly of claim 10, wherein the second seal ring extends circumferentially around a portion of the tapered outer surface of the axial segment.

13. The assembly of claim 10, further comprising:
a spring between the first seal ring and the second seal ring, wherein the spring is configured to bias the first seal ring against the radial segment of the second seat and bias the second seal ring against the radial portion of the first seat.

14. The assembly of claim 9, wherein the first end of the axial portion of the first seat contacts the radial segment of the second seat.

15. The assembly of claim 9, wherein the distal end does not contact the radial portion of the first seat.

16. The assembly of claim 9, wherein the first seat further comprises:
a shelf formed on the radial portion radially outward of the cavity and on an opposite side of the radial portion from the cavity, and
wherein the shelf extends circumferentially around the center axis on the radial portion.

17. The assembly of claim 9, wherein the distal end of the axial segment is tapered.

18. The assembly of claim 9, wherein the distal end of the axial segment is not tapered.

19. The assembly of claim 9, wherein the second seat further comprises:
a ridge extending radially inward of the axial segment and contacting the axial portion of the first seat, and
wherein the ridge extends circumferentially around the center axis.

* * * * *